United States Patent [19]

Reiter et al.

[11] Patent Number: 5,752,243
[45] Date of Patent: May 12, 1998

[54] COMPUTER METHOD AND STORAGE STRUCTURE FOR STORING AND ACCESSING MULTIDIMENSIONAL DATA

[75] Inventors: Allen Reiter, Haifa, Israel; Ian Charles Jose, Bellevue, Wash.

[73] Assignee: Microsoft Corporation, Redmond, Wash.

[21] Appl. No.: 727,131

[22] Filed: Oct. 8, 1996

Related U.S. Application Data

[63] Continuation of Ser. No. 139,916, Oct. 20, 1993, abandoned.

[51] Int. Cl.⁶ .................................................. G06F 17/30
[52] U.S. Cl. ............................. 707/3; 707/101; 707/200
[58] Field of Search .................................. 395/603; 707/3, 707/101, 102, 200

[56] References Cited

U.S. PATENT DOCUMENTS

| | | | |
|---|---|---|---|
| 4,344,134 | 8/1982 | Barnes | 395/800 |
| 4,606,002 | 8/1986 | Waisman et al. | 395/600 |
| 4,841,435 | 6/1989 | Papenberg | 395/250 |
| 5,408,652 | 4/1995 | Hayashi et al. | 395/600 |
| 5,446,887 | 8/1995 | Berkowitz | 395/600 |
| 5,546,571 | 8/1996 | Shan et al. | 395/603 |
| 5,560,007 | 9/1996 | Thai | 395/603 |
| 5,613,105 | 3/1997 | Zbikowski et al. | 395/611 |

FOREIGN PATENT DOCUMENTS

| | | | |
|---|---|---|---|
| 0 375 307 | 6/1990 | European Pat. Off. | G06F 17/30 |
| 2 196 764 | 5/1988 | United Kingdom | G06F 17/30 |

OTHER PUBLICATIONS

Nakamura et al., "MD-tree: A Balanced Hierarchical Data Structure for Multi-dimensional Data with Highly Efficient Dynamic Characteristics," *IEEE 9th International Conference on Pattern Recognition* 1(17):375-378, 1988.

Gerard Salton, "Multiway Search Trees," *Automatic Text Processing*, Chapter 7.6, pp. 183-189, Dec., 1988.

Gerard Salton, "Multidimensional Access Structures," *Automatic Text Processing*, Chapter 7.10, pp. 216-225, Dec., 1988.

K. Culik et al., "Dense Multiway Trees," *ACM Transactions on Database Systems*, vol. 6, 1981, pp. 486-512, Sep., 1981.

Douglas Comer, "The Ubiquitous B-Tree," *Computing Surveys*, vol. 11, Jun. 1979, pp. 121-137.

Cormen et al., "B-Trees," *Introduction to Algorithms*, Chapter 19, pp. 381-399, Jun. 1991.

"How to become a high-performance expert: here's a look at Rdb's high-performance features", DBMS, v4, n4, ps9(6) Apr. 1991.

Data Structure for Multi-Layer N-Dimesional Data Using Hierarchical Structure, Nakamura et al., May 1990, IEEE.

Microsoft Press Computer Dictionary, Second Edition, Jan. 1993, p. 208.

*Primary Examiner*—Thomas G. Black
*Assistant Examiner*—Hosain T. Alam
*Attorney, Agent, or Firm*—Schwegman, Lundberg, Woessner & Kluth, P.A.

[57] ABSTRACT

A computer method and storage structure for storing and accessing multidimensional data is provided. A tree manager provided by the present invention stores data such as pointers, variable length data records, other B-trees, and directories, in a Multidimensional B-tree (MDB-tree). An MDB-tree has an imbedded "parent-child" structure which allows subtrees to be stored within nodes. The subtrees contain subnodes, which, in turn, may contain subtrees. The nodes are indexed by a primary key value while the subnodes in a subtree are indexed by secondary key values. Nodes of a MDB-tree contain a key value table, a subnode table, and a data area. When the tree manager attempts to store a unit of data on a page and the unit of data is too large for the page, the tree manager attempts to split a node currently stored on the page (or the unit of data being inserted) into a subnode and a subtree. The subtree is then stored on a new page. If the unit of data cannot be split into a subnode and a subtree, then one or more of the node currently stored on the page are moved to a new page.

24 Claims, 14 Drawing Sheets

```
U-HAUL-IT CO.
  STORE 1
    ADDRESS
    TELEPHONE NUMBER
    TRUCK INFORMATION
    TRAILER INFORMATION

STORE 2
    ADDRESS
    TELEPHONE NUMBER

STORE 3
    ADDRESS
    TELEPHONE NUMBER

STORE 4
    ADDRESS
    TELEPHONE NUMBER

STORE 5
    ADDRESS
    TELEPHONE NUMBER

STORE 6
    ADDRESS
    TELEPHONE NUMBER

STORE 7
    ADDRESS
    TELEPHONE NUMBER

STORE 8
    ADDRESS
    TELEPHONE NUMBER

STORE 9
    ADDRESS
    TELEPHONE NUMBER

STORE 10
    ADDRESS
    TELEPHONE NUMBER
```

| | 141 | 143 145 | 140 |
|---|---|---|---|
| PAGE ID | OFFSET OF TOP NODE | OFFSET OF NODE1 | OFFSET OF NODE2 |
| TOP NODE | (no key values) | NODE1 | (no data) |
| NODE1 | 5 | NODE2, NODE 3 | (no data) |
| NODE2 | (no key values) | (no subnodes) | STORE 1<br>  ADDRESS<br>  TELEPHONE NUMBER<br>  TRUCK INFORMATION<br>  TRAILER INFORMATION<br><br>STORE 2<br>  ADDRESS<br>  TELEPHONE NUMBER<br><br>STORE 3<br>  ADDRESS<br>  TELEPHONE NUMBER<br><br>STORE 4<br>  ADDRESS<br>  TELEPHONE NUMBER<br><br>STORE 5<br>  ADDRESS<br>  TELEPHONE NUMBER |
| NODE3 | (no key values) | (no subnodes) | STORE 6<br>  ADDRESS<br>  TELEPHONE NUMBER<br><br>STORE 7<br>  ADDRESS<br>  TELEPHONE NUMBER<br><br>STORE 8<br>  ADDRESS<br>  TELEPHONE NUMBER<br><br>STORE 9<br>  ADDRESS<br>  TELEPHONE NUMBER<br><br>STORE 10<br>  ADDRESS<br>  TELEPHONE NUMBER |

*FIG. 7*

COMPUTER METHOD AND STORAGE STRUCTURE FOR STORING AND ACCESSING MULTIDIMENSIONAL DATA

CROSS-REFERENCE TO RELATED APPLICATION

This application is a file wrapper continuation of U.S. patent application Ser. No. 08/139,916, filed Oct. 20, 1993, now abandoned.

TECHNICAL FIELD

This invention relates generally to a computer method and storage structure for storing and accessing data, and more particularly, to a computer method and storage structure for storing and accessing multidimensional data.

BACKGROUND OF THE INVENTION

Conventional storage structures, such as the well known B-tree, are used to quickly locate specific units of data (such as data records in a database) stored on a secondary storage device. A B-tree provides a means of clustering pointers to units of data, so that the units can be quickly located. The pointers are typically small and have a fixed length.

FIG. 1 is a block diagram of a conventional B-tree 100 storing a database index. The B-tree 100 has a root node 101, internal nodes 102, 103, 104, and leaf nodes 105, 106, 107, 108, 109, 110, 111, 112, 113. The root node 101 is the node at the top of the tree 100, the leaf nodes 105, 106, 107, 108, 109, 110, 111, 112 and 113 are those at the bottom of the tree, and the internal nodes 102, 103 and 104 are all of the nodes in between the root node and the leaf nodes.

The root node 101 contains one or more key values and two or more pointers to internal nodes 102, 103 and 104. Each internal node 102, 103 and 104 contains one or more key values and two or more pointers to lower level internal nodes or leaf nodes 105, 106, 107, 108, 109, 110, 111, 112 and 113. Each leaf node 105, 106, 107, 108, 109, 110, 111, 112 and 113 contains key values and pointers to units of data indexed by the key values. For example, the leaf node 107 contains a key value "40" and a pointer 118 to a data record 119 that corresponds to the key value "40." All of the leaf nodes are at the same depth in a B-tree.

Nodes are considered parent nodes to nodes to which they point in the next lower level, which are considered child nodes. Leaf nodes have no child nodes. For example, the internal node 102 is a child node to the root node 101, and a parent node to the leaf nodes 105, 106, 107.

Each key value indicates the highest indexed key value held in a node in the sub-tree for which the node is the parent node. Generally, for any non-leaf node x, if node x contains n[x] key values, then node x also contains n[xj]+1 pointers to child nodes. The key values in node x are used as dividing points to separate the range of key values handled by node x into n[x]+1 subranges. Each subrange is handled by one child of node x.

This proposition can be illustrated by way of example. In FIG. 1, the internal node 102 contains two key values ("12" and "32") and three pointers, one pointer to the leaf node 105, one pointer to the leaf node 106, and one pointer to the leaf node 107. The leaf node 105 contains key values with values less than or equal to "12"; the leaf node 106 contains key values with values greater than "12" and less than or equal to "32"; the leaf node 107 contains key values with values greater than "32" and less than or equal to "50".

Because a B-tree is stored in secondary storage, a common optimization is to have a node occupy an entire page. Since data is typically transferred from secondary storage to main memory a page at a time, only one secondary storage access is required to read all of the key values in a node.

When a node is allowed to occupy an entire page, key values and pointers are added to the node until the node and page are full, i.e., there is no space available in the page. To add a key value to a node that is full, the node is split into two nodes, an additional page is allocated to the B-tree, and one of the two nodes is stored on the new page. The other node is stored on the additional page and at the same level of the B-tree as the node that was split. A key value and a pointer to the new node are added to the parent node of the node that was split. When the parent node becomes full, the parent node is also split using the same technique. Splitting can propagate all the way to the root node, creating a new level in the B-tree whenever the root is split.

Searching for a particular key value in a B-tree is similar to searching a binary tree, except that instead of making a two-way branching decision at each non-leaf node (i.e., deciding which of the two child nodes to examine), a multi-way branching decision is made. The multi-way branching decision depends upon the node's child nodes. As stated above, for a node x containing n[x] key values, node x has n [x]+1 child nodes. Therefore, at each node x, an (n[x]+1)-way branching decision is made.

In order to clarify how searching is performed in a B-tree, it is helpful to consider an example.

Suppose the B-tree of FIG. 1 is an index to a database file and the key values in each node correspond to a key value field in a data record of the database file. To locate data records with a key value field value less than or equal to "50", a first pointer 114 from the root node 101 is followed. To locate data records with a key value field value greater than "50" and less than or equal to 82, a second pointer 115 from the root node 101 is followed. To locate data records with a key value field value greater than "82", a third pointer 116 from the root node 101 is followed. To locate the data record 119 (corresponding to the key value "40"), pointers can be followed from the root node 101 all the way to the data record 119. [Follow the first pointer 114 from the root node 101 to the internal node 102. Next, follow a third pointer 117 from the internal node 102 to the leaf node 107. Search through key values in the leaf node 107 until the key value "40" is found. Finally, follow the pointer 118 from the leaf node 107 to the data record 119.]

For a comprehensive discussion of B-trees and B-tree maintenance algorithms, see Cormen, *Introduction to Algorithms* (The MIT Press 1991), pp. 381–399.

A hierarchical data model is one in which units of data are associated in a multidimensional "parent-child" relationship. In a file system, for example, files and subdirectories descend from a main directory. Each successively lower level in the system is a subdirectory that branches from the one above it. A file system contains multiple levels because each directory or subdirectory can contain both files and other directories. In a hierarchical data model, a user sees data logically organized as a tree, and "units" of data may themselves be trees or subtrees. Because B-trees are useful only for flat (i.e., no imbedded structure) homogeneous collections of data, traditional B-tree structures and maintenance algorithms are inadequate for storing hierarchical data models. Even B*-trees, where leaf nodes contain actual units of data, are inadequate because the units of data are not considered to be logically divisible into smaller units.

SUMMARY OF THE INVENTION

In a preferred embodiment, the present invention provides computer methods and storage structure for storing and accessing multidimensional data in secondary storage. Multidimensional data has an imbedded structure that allows it to be logically divided into subunits of data. A tree manager provided by the present invention stores data such as pointers, variable length data records, other B-trees, and directories, in a Multidimensional B-tree (MDB-tree). Each node in an MDB-tree is a physically contiguous string of bytes, capable of containing zero or more key values, a subnode table, and data.

Because secondary storage is often times logically divided into fixed-size blocks or pages, units of data in an MDB-tree are physically divided into page-size subtrees. The tree manager can cause a "page overflow" either by attempting to store too many units of data on a page, or by attempting to store a single unit of data on a page when the unit is larger than the available space in the page. The methods of the present invention provide two-way page splitting—horizontal and vertical—for handling page overflows.

When the tree manager attempts to store too many units of data on a page, the tree manager must split the page horizontally, which is the conventional B-tree node splitting scheme. A horizontal split of a single page can cause another level to be added to the MDB-tree, thereby slowing down searches of the tree.

When the tree manager attempts to store a unit of data on a page and the unit of data is larger than the available space in the page, the tree manager selects a unit of data and splits the unit of data vertically. The unit of data that is vertically split is not necessarily the unit of data whose insertion caused the overflow. The tree manager selects some unit of data considered the most appropriate for splitting. Vertical splitting assumes that the unit of data can be divided into subtrees.

To split a unit of data vertically, the tree manager first requests allocation of a new page, and then creates and stores a Top of Page (TOP) node as the first node in the new page. The new page is referred to as a step-child page. Next, the tree manager divides the unit of data into first and second subtrees and moves the second subtree to the new page. The second subtree is becomes child nodes to the TOP node. The tree manager stores a pointer node, which contains only a pointer to the step-child page, where the second subtree used to be stored. The tree manager then places a pointer to the pointer node into the subnode table of the split node.

The creation of the step-child page adds another level to the split unit of data, but does not add another level to other units of data in the MDB-tree. Therefore, vertically splitting a unit of data does not slow down a search of the MDB-tree. Therefore, when traversing an MDB-tree, the tree manager effectively ignores a subtree spanning several pages if the highest node in the subtree does not have the required key value. The pointer nodes and the TOP nodes are invisible to all but the tree manager.

BRIEF DESCRIPTION OF THE DRAWINGS

FIG. 6A is a block diagram of a unit of data that is stored in selected subnodes of the Multidimensional B-tree of FIG. 5.

FIG. 7 is a block diagram of the subunits of data of FIG. 6B stored on a secondary storage device according to the storage format of FIG. 4.

DETAILED DESCRIPTION OF THE INVENTION

In a preferred embodiment of the present invention, a tree data structure known as a multidimensional B-tree (MDB-tree) serves as an index to a quantity of data, such as a database. The MDB-tree is formed of nodes, all of which are structured so that they may hold data. Thus, both leaf nodes and non-leaf nodes of the MDB-tree may hold data. The types of data that may be held in the MDB-tree include hierarchical data. One difficulty with hierarchical data is that hierarchical data is typically too large to store in a node; hence, in an MDB-tree the hierarchical data is stored as a separate subtree. A corresponding node of the MDB-tree holds a pointer for accessing the subtree. The nodes of the MDB-tree are located by conducting a search of the key values held in the nodes. A node in a subtree, however, is found by first conducting a search to locate the node that has a key value for the subtree and then conducting a second search of the nodes of the subtree to locate the desired node. As such, it is apparent that the subtrees provide an added dimension to the tree that makes the tree multidimensional.

Figure 1:
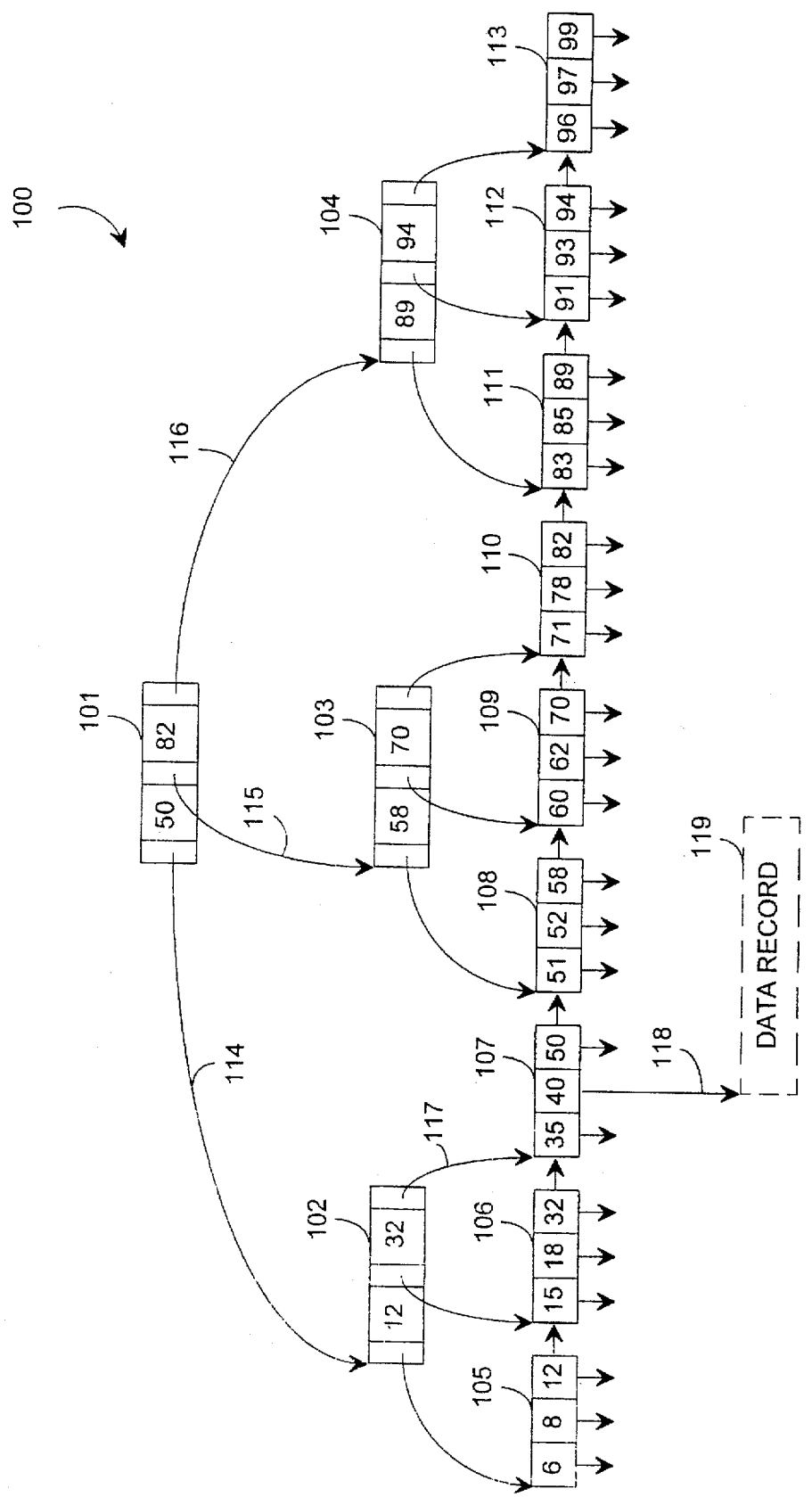
FIG. 1 is a block diagram of a conventional B-tree.
Figure 2:
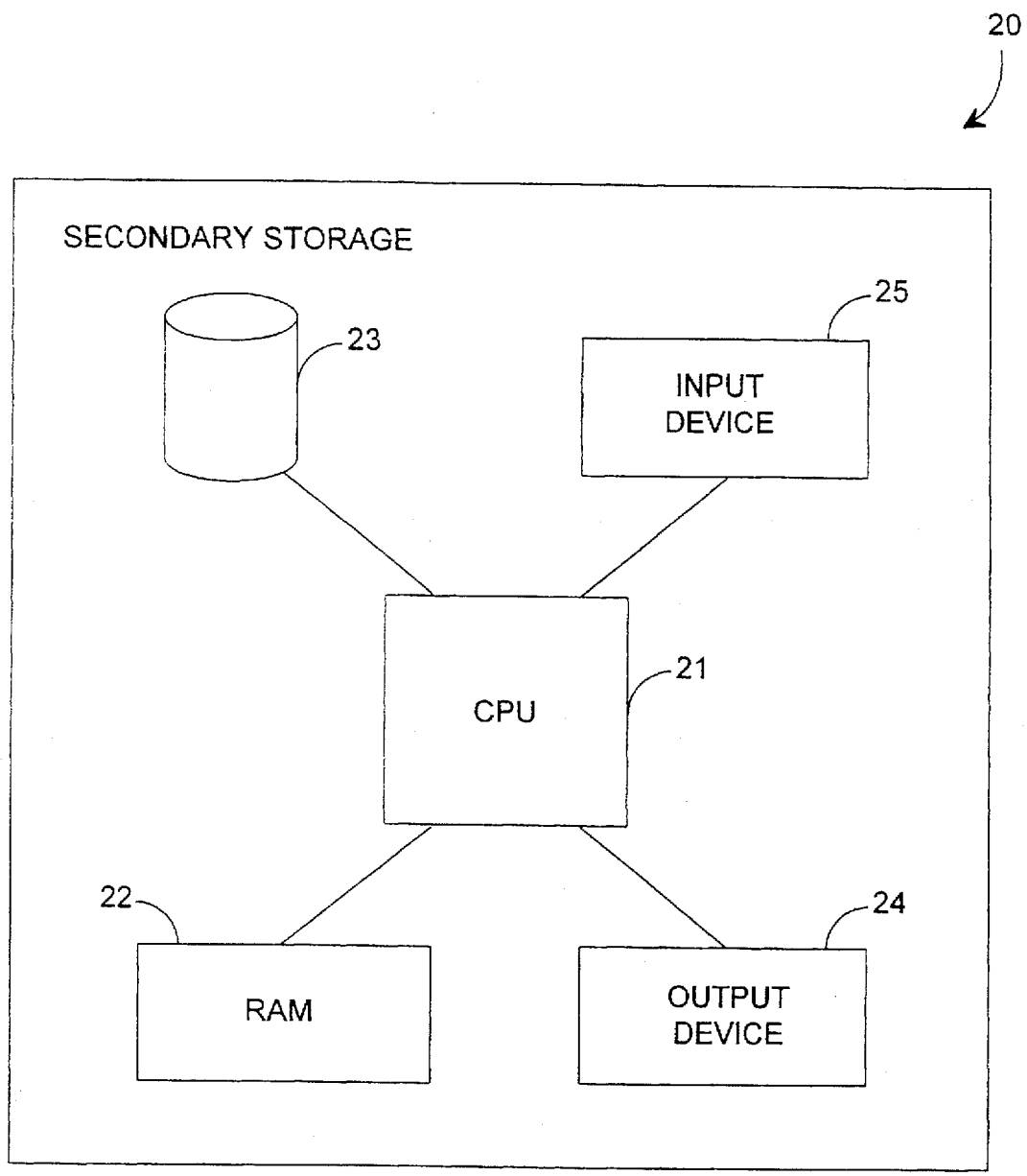
FIG. 2 is a block diagram of a preferred embodiment of a computer system for practicing a preferred embodiment of the present invention.

FIG. 2 is a block diagram of a preferred embodiment of a computer system 20 for practicing the preferred embodiment of the present invention. The computer system 20 comprises a central processing unit (CPU) 21, a random access memory device (RAM) 22, a secondary storage device 23, an input device 25, and an output device 26. The secondary storage device 23 is preferably some kind of disk system.

Figure 3A:
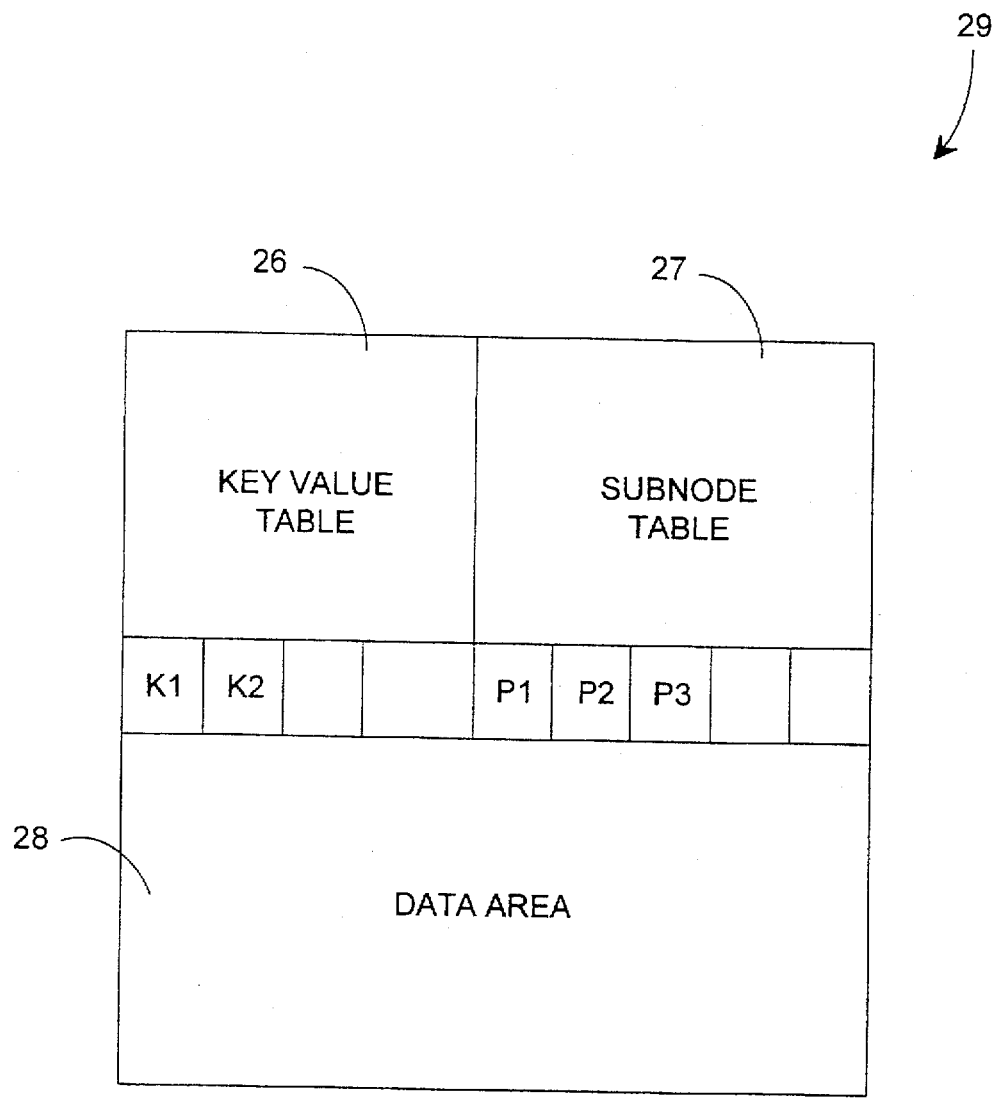
FIG. 3A is a block diagram of a node comprising of a key value table, subnode table, and a data area.

As mentioned above, an MDB-tree is made of nodes. FIG. 3A is a diagram that shows the format of a node 29. The node 29 includes a key value table 26, a subnode table 27 and a data area 28. The key value table holds key values: K1 and K2. These key values act as search keys that are used in searching the MDB-tree. The subnode table 27 stores pointers to subnodes: Pointer 1, Pointer 2, and Pointer 3. The subnodes may be other nodes or pointer nodes (as will be described in more detail below). The data area 28 holds data for which it is desirable to directly incorporate the data in the node.

Figure 3B:
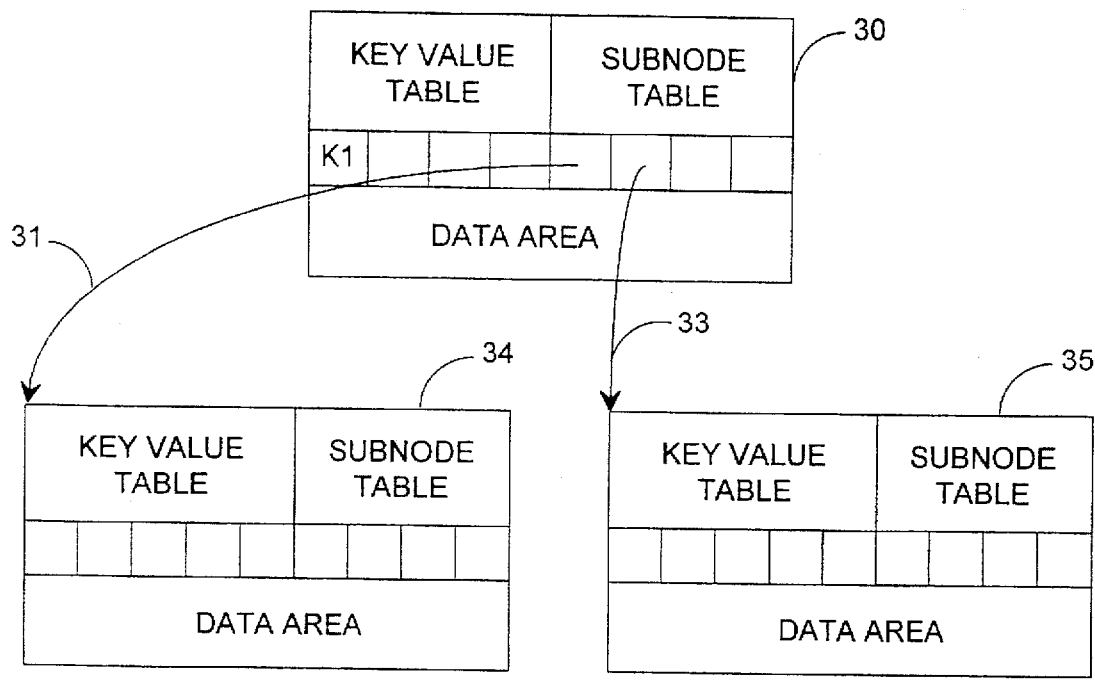
FIG. 3B is a block diagram of a parent node, a first child node, and a second child node in a Multidimensional B-tree.

The roles served by the key values in the key value table 26 and the pointers in the subnode table 27 are perhaps best explained by examining a small portion of an MDB-tree. FIG. 3B is a block diagram of a portion of an MDB-tree that includes a parent node 30, a first child node 34, and a second child node 35. The parent node 30 holds a key value "K1" in its key value table. The parent node 30 also holds a pointer 31 in its subnode table that points to the first child node 34 (which holds data associated with key values less than or equal to "K1") and a pointer 33 that points to the second child node 35 (which holds data associated with key values greater than "K1").

In the illustration of FIG. 3B, the pointers of the subnode table of the parent node 30 point only to child nodes. It should be appreciated that the pointers of the subnode table may also point to pointer nodes. Pointer nodes provide access to subnodes that hold hierarchical data.

Figure 3C:
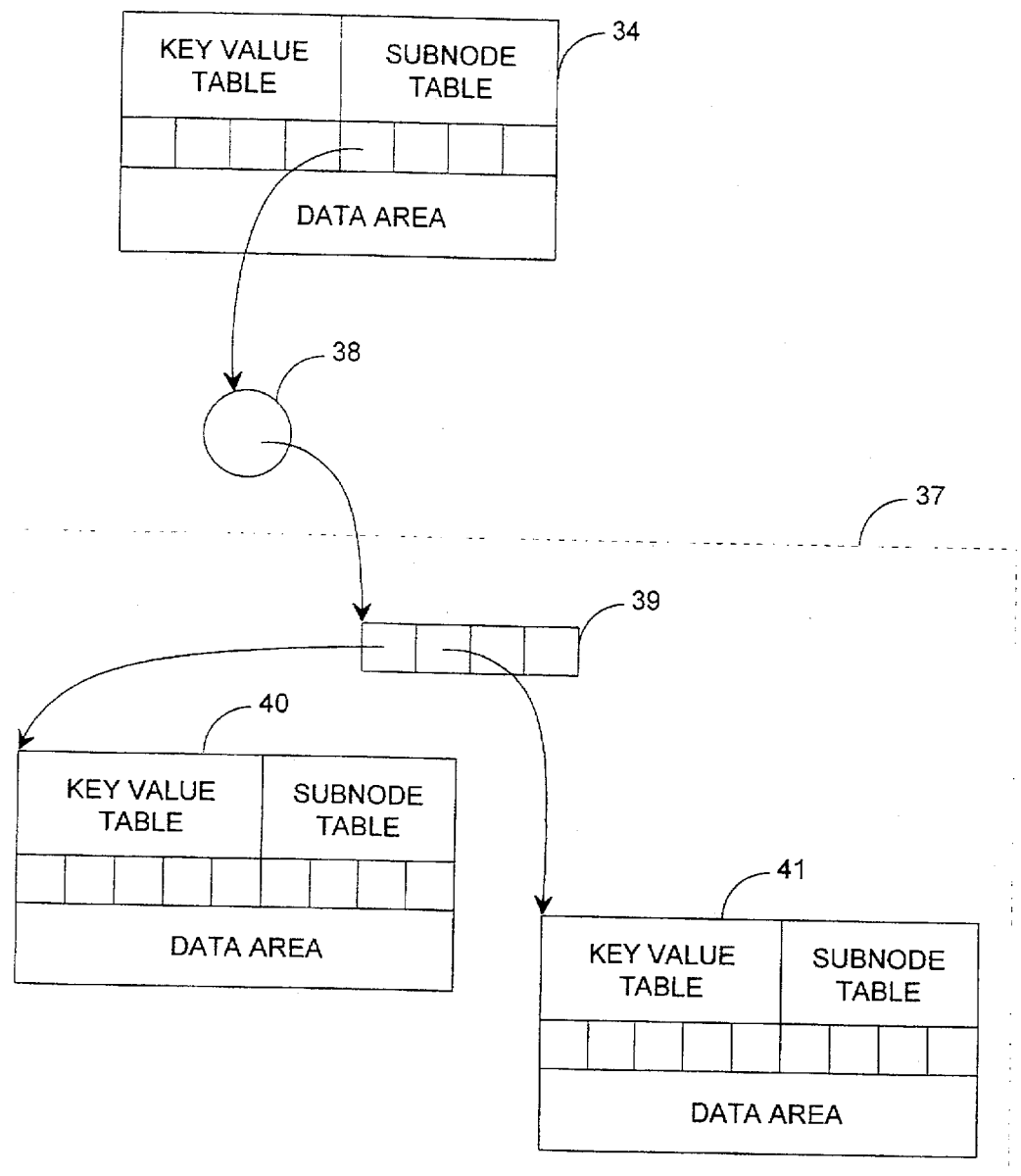
FIG. 3C is a block diagram of the first child node of FIG. 3B split into a subnode and a subtree.

FIG. 3C is a diagram illustrating an instance wherein the first child node 34 of FIG. 3B includes a pointer to a pointer node 38 in its subnode table. The pointer node 38, in turn, points to a subtree 37. The subtree 37 includes a top-of-the-page (TOP) node 39, a first subnode 40, and a second subnode 41. A TOP node is a special kind of node that holds only node identifiers (i.e., pointers). A TOP node does not include any key values or other data. A node identifier for the pointer node 38 is stored as the pointer in the subnode table of the parent node 30. A node identifier for the TOP node 39 is stored as the pointer in the pointer node 38. In addition, node identifiers for the first subnode 40 and the second subnode 41 are stored in the TOP node 39. The additional level of indirection provided by the pointer node 38 allows the subtree 37 to logically appear as if it is stored "within" the first child node 34. The details of the pointer node 38 and the TOP node 39 will be described below.

It should be appreciated that although FIGS. 3B and 3C illustrate pointers pointing exclusively to child nodes and pointer nodes, respectively, it should be appreciated that the subnode table of a node may concurrently hold pointers to multiple types of subnodes. Thus, the subnode table of a node may simultaneously include a pointer to a child node and a pointer to a pointer node.

Figure 3D:
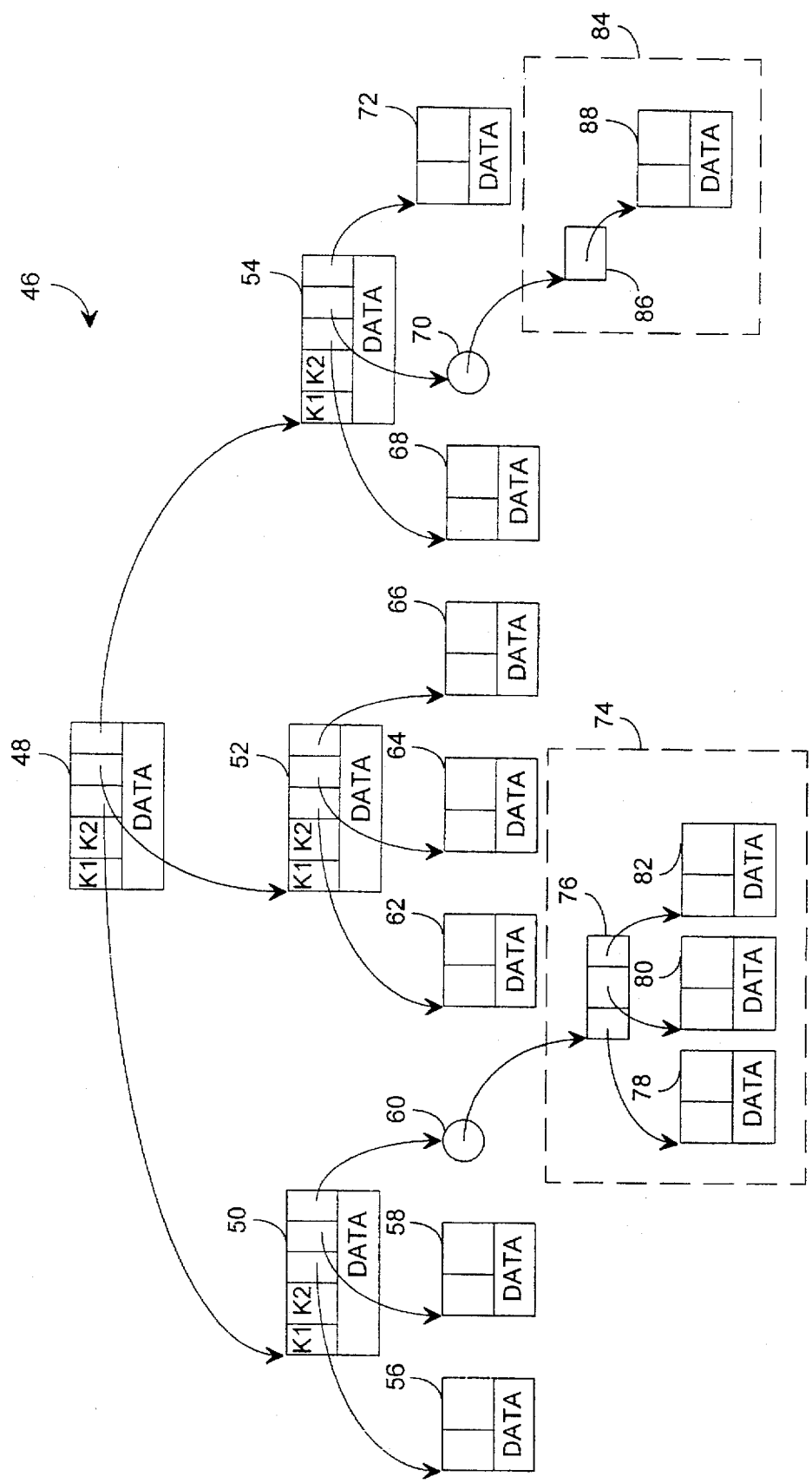
FIG. 3D is a block diagram of a Multidimensional B-tree structure.

FIG. 3D is a block diagram of an illustrative MDB-tree 46. A root node 48 has three child subnodes 50, 52, and 54. The subnode 50, in turn, has three subnodes 56, 58 and 60. The subnodes 56 and 58 are known as leaf nodes because they do not have any child nodes. Leaf nodes do not contain any key values or pointers to subnodes. Subnode 60 is a pointer node that contains a pointer to a subtree 74 that includes subnodes 76, 78, 80 and 82. Subnode 52 of the root node 48 also includes several subnodes 62, 64, 66. Subnodes 62, 64 and 66 are all leaf nodes. Subnode 54 of the root node 48 likewise has several subnodes 68, 70 and 72. Subnodes 68 and 72 are leaf nodes whereas subnode 70 is a pointer node that points to a subtree 84. The subtree 84 includes a TOP node 86 and a leaf node 88.

An example is helpful to illustrate how a MDB-tree like that shown in FIG. 3D may be used to index data. TABLE A shown below contains an illustrative data file that is well-suited to be stored in an MDB-tree. The units of data in the data file have varying lengths, due to the varying levels of detail contained in each unit. The units of data represent hierarchical data commonly found in a business telephone directory (i.e., an electronic business telephone directory). Even though a telephone directory usually contains many more than three subject headings, for ease of explanation the data file is shown with only three main subject headings (I, II, III).

The units of data are shown ordered alphabetically by subject heading ("AUTOMOTIVE PARTS," "MOVING COMPANIES," and "WASHERS & DRYERS"). As is typical of this type of information, some of the units of data can be logically divided into subunits. For example, the different store locations for the moving company "U-HAUL-IT COMPANY" are logically divided into ten subunits. The subunits are ordered by store number.

TABLE A

| I. | AUTOMOTIVE PARTS | | | |
|---|---|---|---|---|
| | A. | AL'S PARTS STORE | | |
| | | 1. | ADDRESS | |
| | | 2. | TELEPHONE NUMBER | |
| | | 3. | PARTS LIST | |
| | | | a. | PART NUMBER 1 |
| | | | b. | PART NUMBER 2 |
| | | | . | |
| | | | . | |
| | | | n. | PART NUMBER 50 |
| | B. | THE CAR STORE | | |
| | | 1. | ADDRESS | |
| | | 2. | TELEPHONE NUMBER | |
| | | 3. | PICTURE OF STORE FRONT | |
| | | 4. | PARTS LIST | |
| | | | a. | PART NUMBER 1, DESCRIPTION |
| | | | b. | PART NUMBER 2, DESCRIPTION |
| | | | . | |
| | | | . | |
| | | | n. | PART NUMBER 50, DESCRIPTION |
| II. | MOVING COMPANIES | | | |
| | A. | JOE'S MOVERS, INC. | | |
| | | 1. | ADDRESS | |
| | | 2. | TELEPHONE NUMBER | |
| | B. | U-HAUL-IT CO. | | |
| | | 1. | STORE 1 | |
| | | | a. | ADDRESS |
| | | | b. | TELEPHONE NUMBER |
| | | | c. | TRUCK INFORMATION |
| | | | d. | TRAILER INFORMATION |
| | | 2. | STORE 2 | |
| | | | a. | ADDRESS |
| | | | b. | TELEPHONE NUMBER |
| | | . | | |
| | | . | | |
| | | 10. | STORE 10 | |
| | | | a. | ADDRESS |
| | | | b. | TELEPHONE NUMBER |
| III. | WASHERS & DRYERS - see APPLIANCES | | | |

An MDB-tree allows the data shown in TABLE A to be efficiently organized and stored on the secondary storage device 23 (FIG. 2). A conventional B-tree cannot accommodate the data shown in TABLE A because a conventional B-tree only stores key values and pointers to data. Even a B*-tree, which stores units of data in the leaf nodes, cannot accommodate the data shown in TABLE A because a B*-tree only stores small, atomic units of data in its leaf nodes. Because an MDB-tree can store data, a unit of data may contain a subtree, and a subnode of the subtree may contain another subtree, and so on. An MDB-tree takes into account logical divisions of data into subunits, thereby allowing large units of data to be stored therein.

Figure 4:
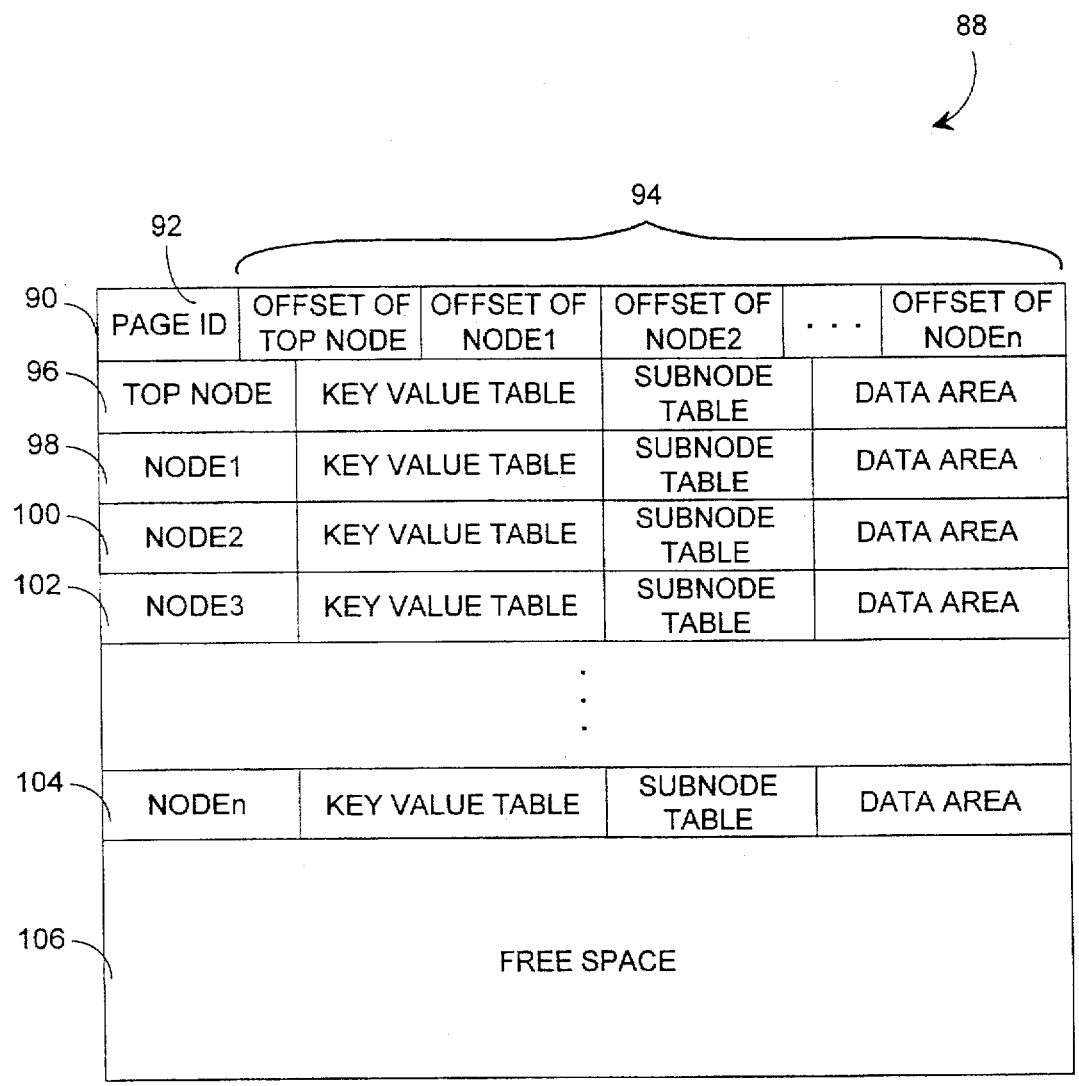
FIG. 4 is a block diagram of a storage format for a Multidimensional B-tree in the preferred embodiment of the present invention.

Before continuing with the discussion of the example MDB-tree that holds the data of Table A, it is necessary first to discuss a page format for the MDB-tree. FIG. 4 is a block diagram of a storage format for a page 88 of an MDB-tree in the preferred embodiment of the present invention. A page is a contiguous block of storage space and commonly has a size of 4 KB. An MDB-tree is written to the secondary storage device 23 and read from the secondary storage device 23 in page units. For space optimizing, each node of MDB-tree is preferably a page in length.

The page 88 contains a header area 90, which contains a page identifier 92 and an array of tags 94. The header area 90 may also contain an indicator that specifies the amount of free space left on the page 88. The remainder of the page 88 contains a top-of-the-page (TOP) node entry 96, a plurality of node entries 96, 98, 100, and 104, and a free space area 106. The free space area 106 is storage space that is not currently allocated. The array of tags 94 contains offsets identifying the beginning of each node entry stored on the page 88. Each node entry 96, 98, 100, and 104 is not necessarily the same size as the other node entries. The TOP node entry 96 is preferably always identified by TAG [0], (i.e., the first tag in the array of tags 94). Because the array of tags 94 keeps track of the location of the node entries 96, 98, 100, and 104 on the page 88, external references to a node entry only have to keep track of a page number and a tag number.

When storing units of data in secondary storage, the tree manager provided by the present invention can cause a "page overflow" either by attempting to store too many units of data on a page, or by attempting to store a unit of data on a page when the unit is larger than the available space on the page. The methods of the present invention provide two-way page splitting—horizontal and vertical—for handling page overflows. A horizontal split is the type of split used by conventional B-tree algorithms. Horizontal and vertical page splitting are explained below in detail with references to FIGS. 8A–8C.

Figure 5:
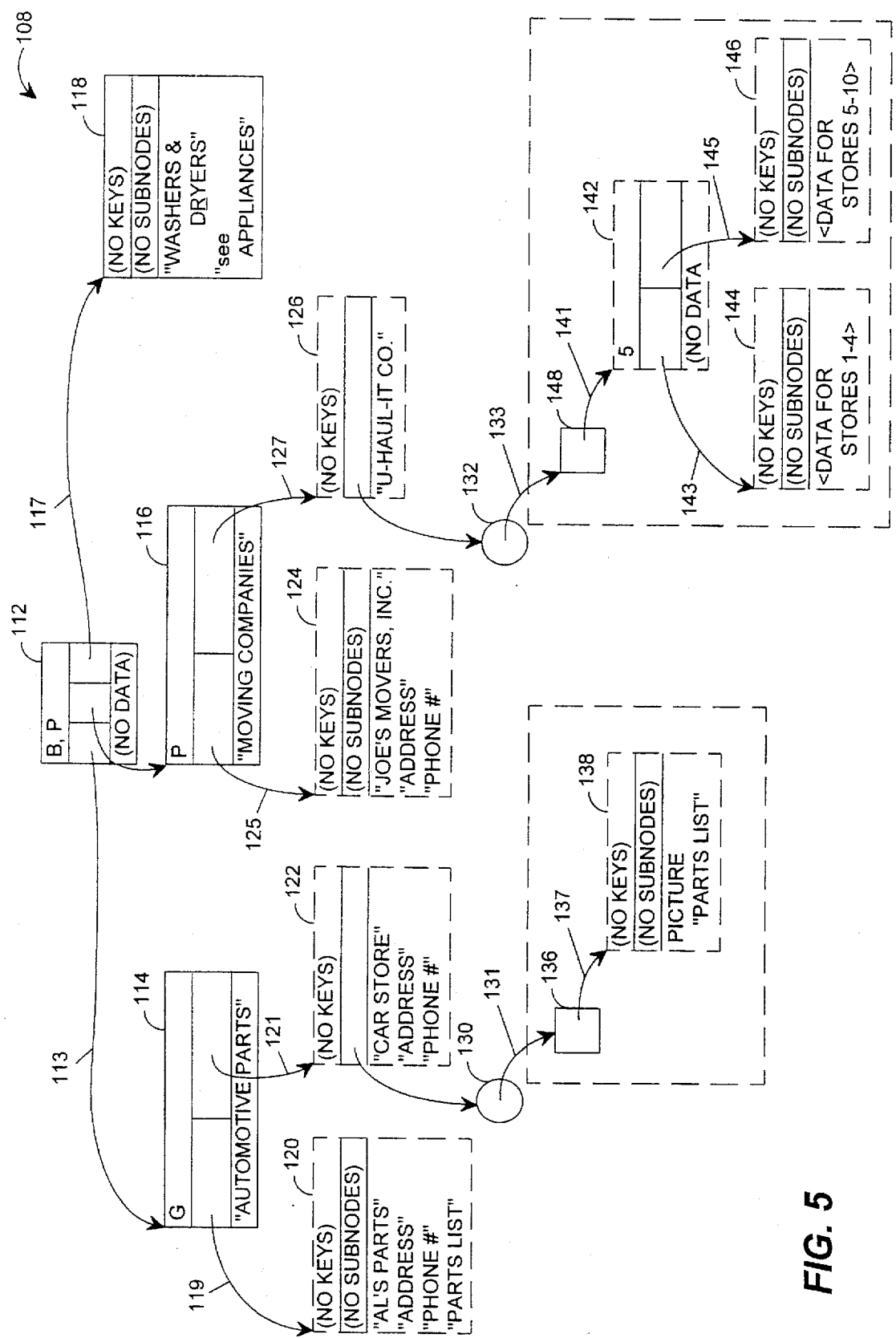
FIG. 5 is a block diagram of illustrative data stored in nodes and subnodes of a Multidimensional B-tree.

FIG. 5 is a block diagram of the data shown above in TABLE A when organized into an MDB-tree 108. A first page 110 contains nodes 112, 114, 116, 118, 120, 122, 124 and 126. The page 110 additionally includes a TOP node 128 and pointer nodes 130 and 132. A second page 134 of the MDB-tree 108 contains a TOP node 136 and a node 138. A third page 140 of the MDB-tree 108 contains nodes 142, 144, and 146, and a TOP node 148.

A root node 112 contains key values "B" and "P" in its key value table and node identifiers for the child nodes 114, 116, and 118 in its subnode table. As in a conventional B-tree, the key values stored in node 112 provide a basis for deciding which path should be followed to the next lower level when searching the MDB-tree 108. Thus, pointer 113, which points to child node 114, is followed when the key value being sought is less than or equal to "B". Pointer 115, which points to child node 116, is followed when the key value being sought is greater than "B" but less than or equal to "P". Lastly, pointer 117, which points to child node 118, is followed when the key value being sought is greater than "P". Node 112 does not include any data in its data area. Note that a more realistic telephone directory would contain more key values.

Node 114 contains a secondary key value "G", which indexes the entries under the subject heading "AUTOMOTIVE PARTS." The subnode table in node 114 contains node identifiers (i.e., pointers 119 and 121) for subnodes 120 and 122. Subnode 120 does not contain any key values or node identifiers. Subnode 120 contains data for "AL'S PARTS STORE," which includes the name of the store, address of the store, telephone number of the store, and a parts list.

Subnode 122, like subnode 120, does not contain any key values, but it does contain a node identifier 131 for the pointer node 130. The pointer node 130 contains a node identifier 131 for the subtree 134, which is stored on a different page than the node 122. The subtree 134 consists of a TOP node 136 and a subnode 138. The TOP node 136 contains a node identifier 137 for the subnode 138, which contains data that is too large to be stored on the same page as subnode 122. The data contained in the data area of subnode 138 includes a bitmap of a picture and a parts list. Subnode 138 contains no key values in its key value table and no node identifiers in its subnode table.

Child node 116 contains a secondary key value "P", which indexes the entries under the subject heading "MOVING COMPANIES". The subnode table in child node 116 contains two node identifiers 125 and 127. Node identifier 125 points to subnode 124 and is followed when one is looking for a secondary key value that is less than or equal to "P". Node identifier 127 points to subnode 126 and is followed when one is looking for a secondary key value that is greater than "P".

Subnode 124 is a leaf node that contains no key values or node identifiers. The data area of node 124, however, holds the data for "JOE'S MOVERS, INC.".

Subnode 126 also does not include any key values. Node 126 does, on the other hand, include a node identifier 133 that points to a pointer node 132. The pointer node 132 points to a subtree 140. The subtree 140 consists of a TOP node 148, and three subnodes 142, 144 and 146. The TOP node 148 contains a node identifier 141 that points to subnode 142, which indexes the data contained in subnodes 144 and 146. The data areas of subnodes 144 and 146 contain data regarding "U-HAUL-IT-COMPANY".

Subnode 142 contains a secondary key value "5". Subnode 142 additionally includes node identifiers 143 and 145, which point to subnodes 144 and 146, respectively.

The node identifier 143 is followed for store number secondary key values that are less than or equal to "5".

Node 144 is a leaf node of the subtree 140 that holds the data for stores "1" through "5" in its data area. Subnode 144 includes no key values or node identifiers. Subnode 146 is also a leaf node of the subtree 140 but holds data for stores "6" through "10" in its data area. Like subnode 144, subnode 146 contains no key values or node identifiers. Subnodes 144 and 146 are child nodes of subnode 142.

Child node 118 is a leaf node of the MDB-tree 108. Child node 118 contains no key values or node identifiers. The data area of node 118 identifies the subject heading "WASHERS & DRYERS" and the cross-reference "SEE APPLIANCES".

Figure 6B:
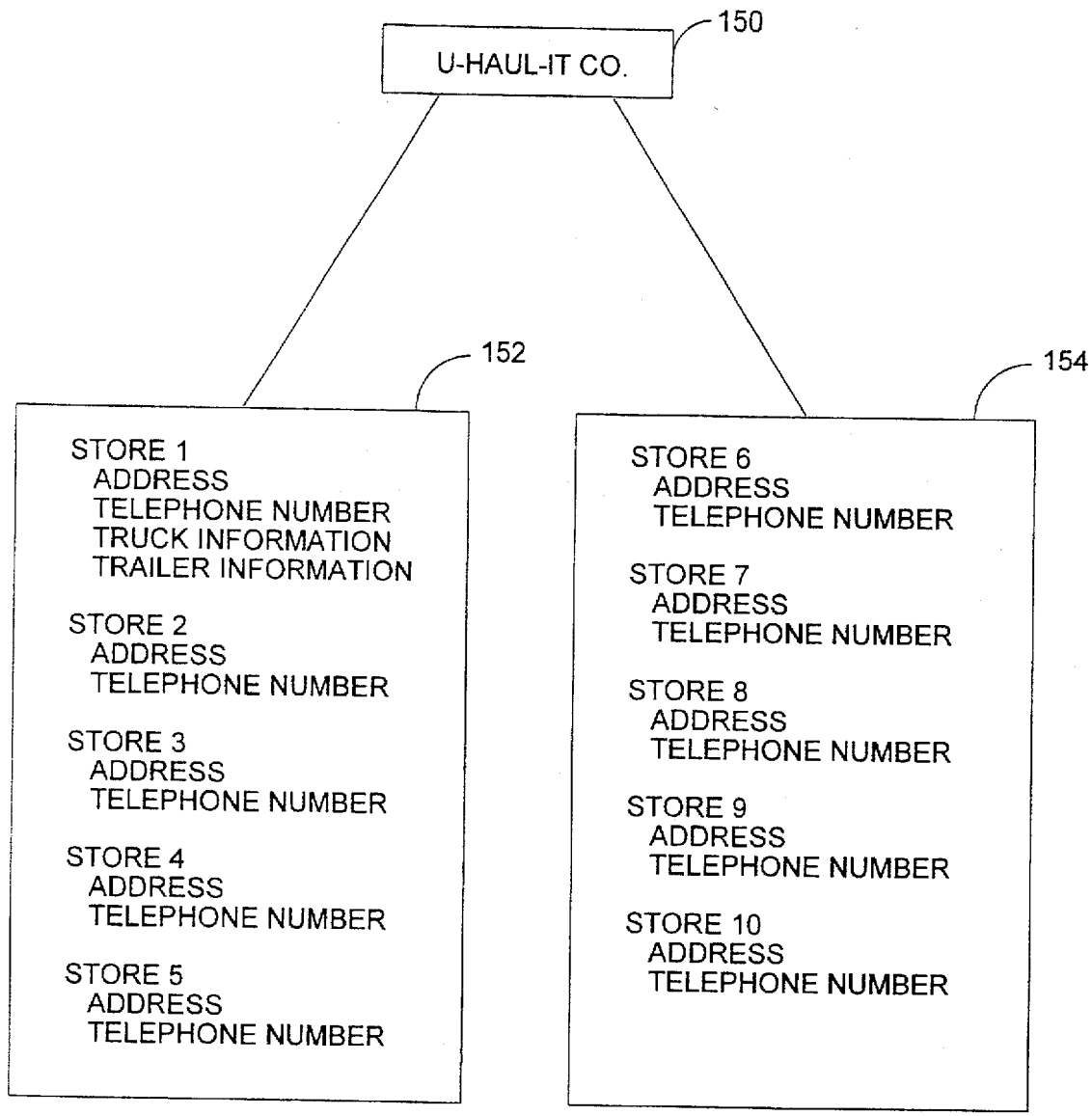
FIG. 6B is a block diagram of the unit of data of FIG. 6A divided into subunits.

It would be helpful to see how the subtree 140 is actually stored in secondary storage. But first, it is important to examine the structure of the unit of data contained in the subtree 146. FIG. 6A is a block diagram of the unit of data 150, and FIG. 6B is a block diagram of the unit of data 150 after it has been partitioned into subunits 152, 154, and 156.

FIG. 7 is a block diagram of the subtree 140 stored on a secondary storage device according to the storage format of FIG. 4. The subtree 140 consists of four node entries 148, 142, 144, and 146. The TOP node 148 contains a pointer 141 to the subnode 142. The TOP node 140 does not contain any key values or data. The subnode 142 contains a "5" in its key value table and pointers 143 and 145 in its subnode table. Pointer 143 points to subnode 144, and pointer 145 points to subnode 146. The subnode 144 does not contain key values or pointers to subnodes, but does not contain the subunit of data 152 (FIG. 6B). Similarly, the subnode 146 does not contain key values or pointers to subnodes but does contain the subunit of data 154 (FIG. 6B).

Referring now to FIG. 5, the MDB-tree 108 is traversed using conventional B-tree traversal routines which examine key values and follow pointers depending upon when an appropriate key value is found. The pointer nodes 130 and 132 and the TOP nodes 136 and 148 are invisible to the routines that maintain the MDB-tree 108, unless the routines "look inside" of the nodes 122, 126.

To insert a unit of data into the MDB-tree 108, the preferred embodiment of the present invention provides an insertion routine. The insertion routine is explained below in detail with reference to FIGS. 8A–8C. Before describing the details of the insertion routine, however, it is helpful to first describe an overview of the insertion routine and the horizontal and vertical splits.

After determining where (i.e., what page) in the MDB-tree 108 a unit of data belongs, the tree manager attempts to store the unit of data on the page. If the unit is larger than the available space on the page, the preferred embodiment attempts to split either a unit of data currently stored on the page, the unit of data being inserted, or the page itself. Splitting a unit of data is referred to as a vertical split, while splitting a page is referred to as a horizontal split.

Generally, vertical splitting assumes that the unit of data being split can be partitioned into subnodes. One of the subnodes is stored on the page, and the other subnodes are stored as a subtree on a new page. (A subtree may be represented by only one subnode.) A pointer to the new page is then stored in a pointer node, that is listed as a node entry in the subnode table of the subnode. The creation of the pointer node and the new page does not add another level to the entire MDB-tree. Rather, only the unit of data which was split gains an additional level.

The determination of how many subunits a unit of data is divided into depends upon how much free space is available on a page and the structure of the unit of data. The unit of data 150 (FIG. 6A) could have been split into any number of subunits.

When the preferred embodiment of the present invention attempts to store too many units of data on a page, the page may be split horizontally if no units of data can be split vertically. Generally, to split a page horizontally, the tree manager moves a subset of the page's node entries to a new adjacent page and stores a new key value and a pointer to the new page in the parent page to the page being split. As in a conventional B-tree, the old page and the new adjacent page are linked by next page and previous page link fields in the page headers. The next page and previous page link fields facilitate tree traversal without needing to visit upper-level pages of the tree.

Figure 8A:
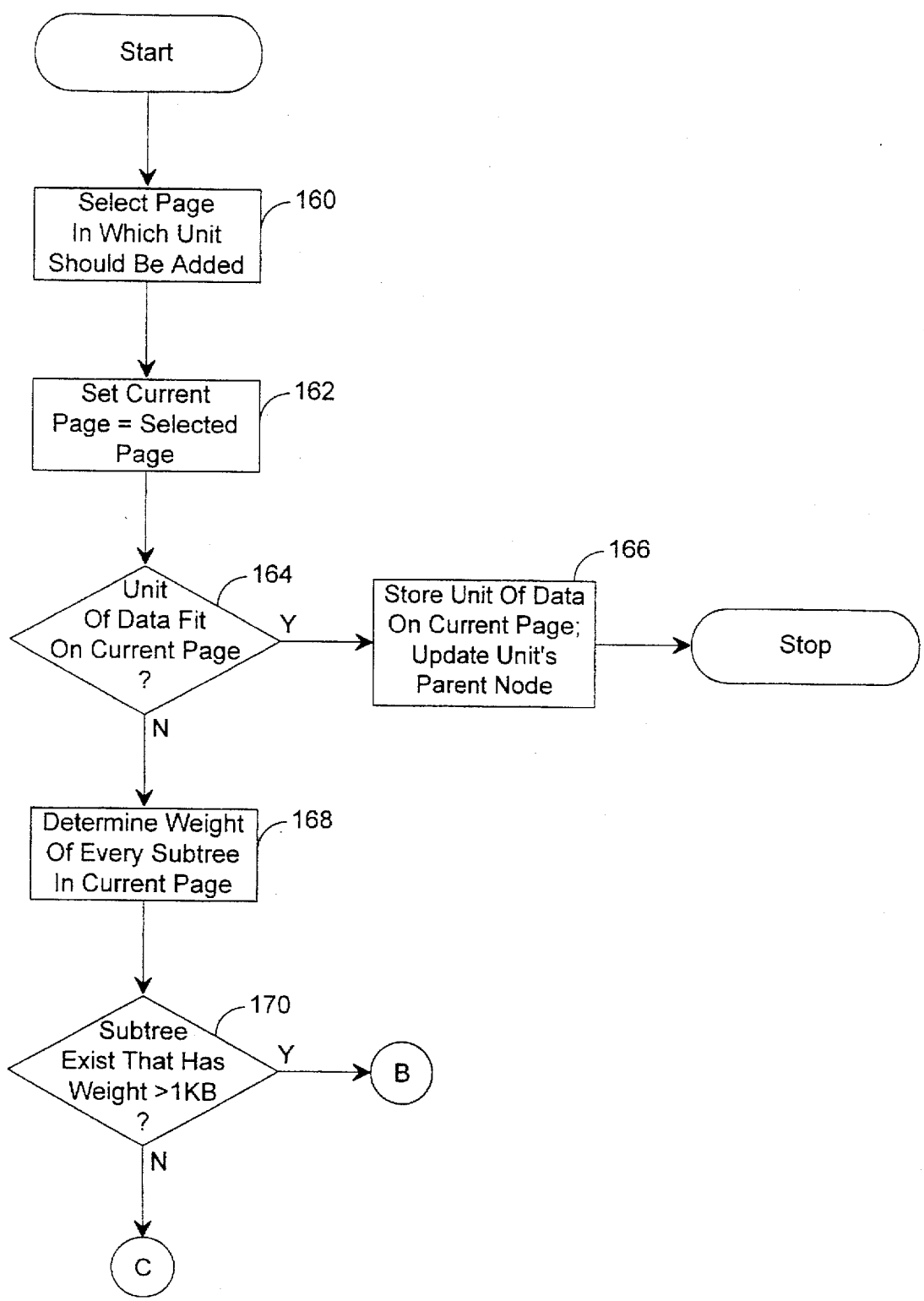
FIGS. 8A–8C comprise a detailed flow diagram of a method used in a preferred embodiment to store a unit of data on the secondary storage device using the storage format of FIG. 4.

Given the above discussion of the MDB-tree's structure, it is helpful to look at how the tree is maintained. In the preferred embodiment of the present inventor described herein, the MDB-tree is maintained by a tree manager that is part of a file system. FIG. 8A is a flow diagram of the steps performed by the tree manager in storing a new unit of data in the MDB-tree. In step 160, the tree manager selects a page in which the new unit of data should be stored. This selection requires a search of the MDB-tree to find an appropriate page. In step 162, the tree manager sets a current page variable to the selected page. The current page variable is any data structure suitable for holding a value. In step 164, the tree manager determines whether the new unit of data to be inserted into the MDB-tree will fit on the current page as designated by the current page variable. That is, the tree manager determines whether the size of the unit of data is less than the size of the available space on the current page. If the unit of data will fit on the current page, then in step 166 the tree manager stores the unit of data on the current page, and updates the inserted unit's parent node. Updating the parent node involves storing a pointer to the inserted unit in the subnode table of the parent node.

If the unit of data will not fit on the current page (step 164), then in step 168 the tree manager determines the weight of every subtree in the current page. The "weight" of a subtree is the size of every subnode in the subtree. If a subtree exists that has a weight greater than 1 KB (step 170), for example, then the tree manager vertically splits that subtree. A vertical split is described in more detail with reference to FIG. 8B. If a subtree does not exist that has a weight greater than 1 KB (see step 170), then the tree manager horizontally splits the current page. A horizontal split is described in more detail with reference to FIG. 8C.

Figure 8B:
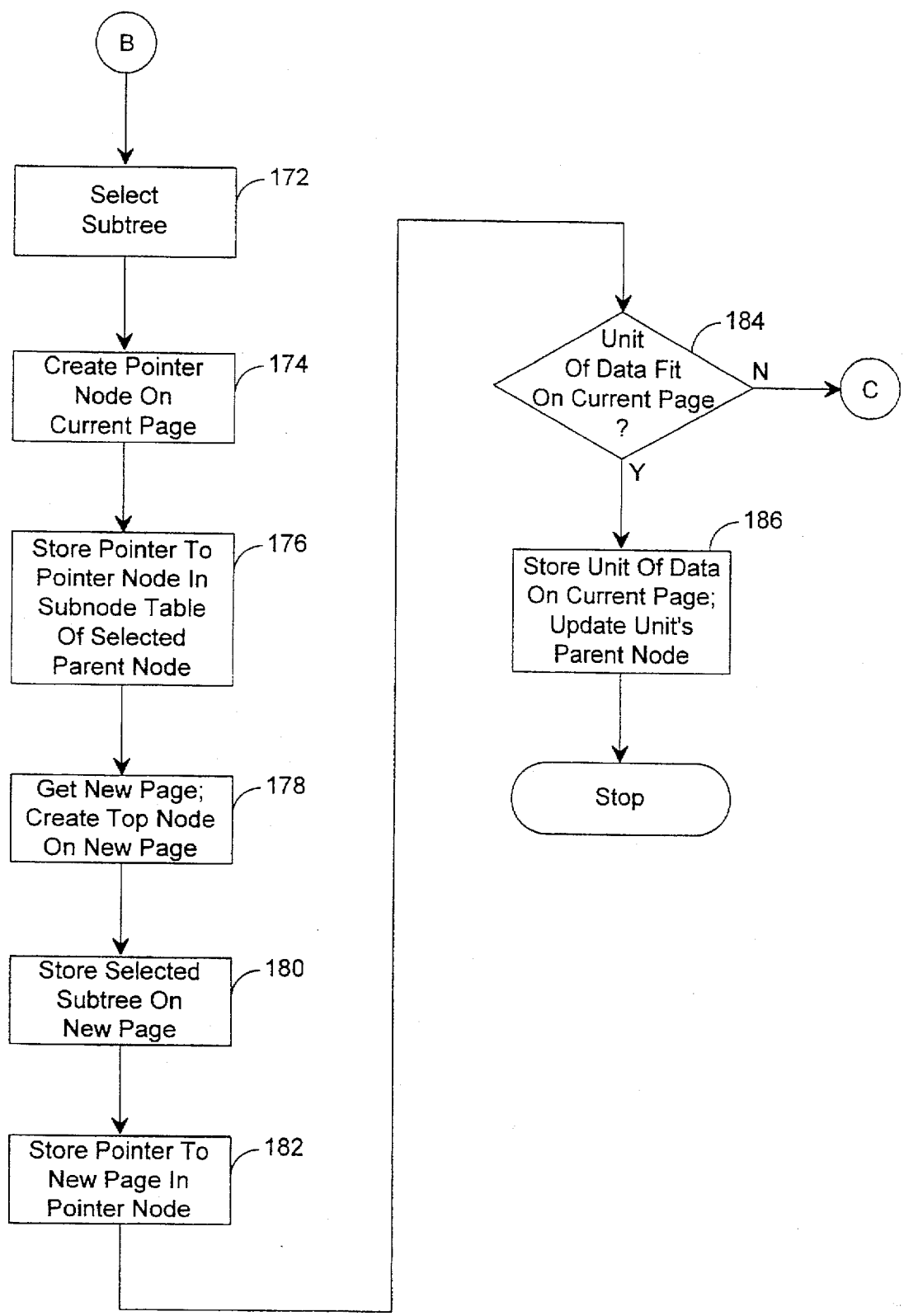

FIG. 8B is a flow diagram of the steps carried out by the tree manager to vertically split a node (see "B" in FIGS. 8A and 8B). Vertical splitting of a node results in a subtree of the node being moved to a new page. In step 172, the tree manager selects the subtree that has a weight greater than 1 KB (see step 170). In step 174, the tree manager creates a pointer node and stores the pointer node on the current page. In step 176, the tree manager stores the node identifier of the pointer node in the subnode table of the selected subtree's parent node. In step 178, the tree manager requests allocation of a new page from a memory management routine provided by the file system and stores a TOP node on the new page. In step 180, the tree manager stores the selected subtree on the new page (as a subtree of the TOP node) and stores a pointer to the subtree in the subnode table of the TOP node. In step 182, the tree manager stores a pointer to the TOP node in the pointer node. After the vertical split, in step 184 the tree manager again determines whether the unit of data will fit on the current page (see "C" in FIG. 7B). If the unit of data will still not fit on the current page, then the tree manager horizontally splits the current page. If the unit of data will fit on the current page, then in step 186 the tree manager stores the unit of data on the current page, and stores a pointer to the unit of data in the subnode table of the inserted unit's parent node.

Figure 8C:
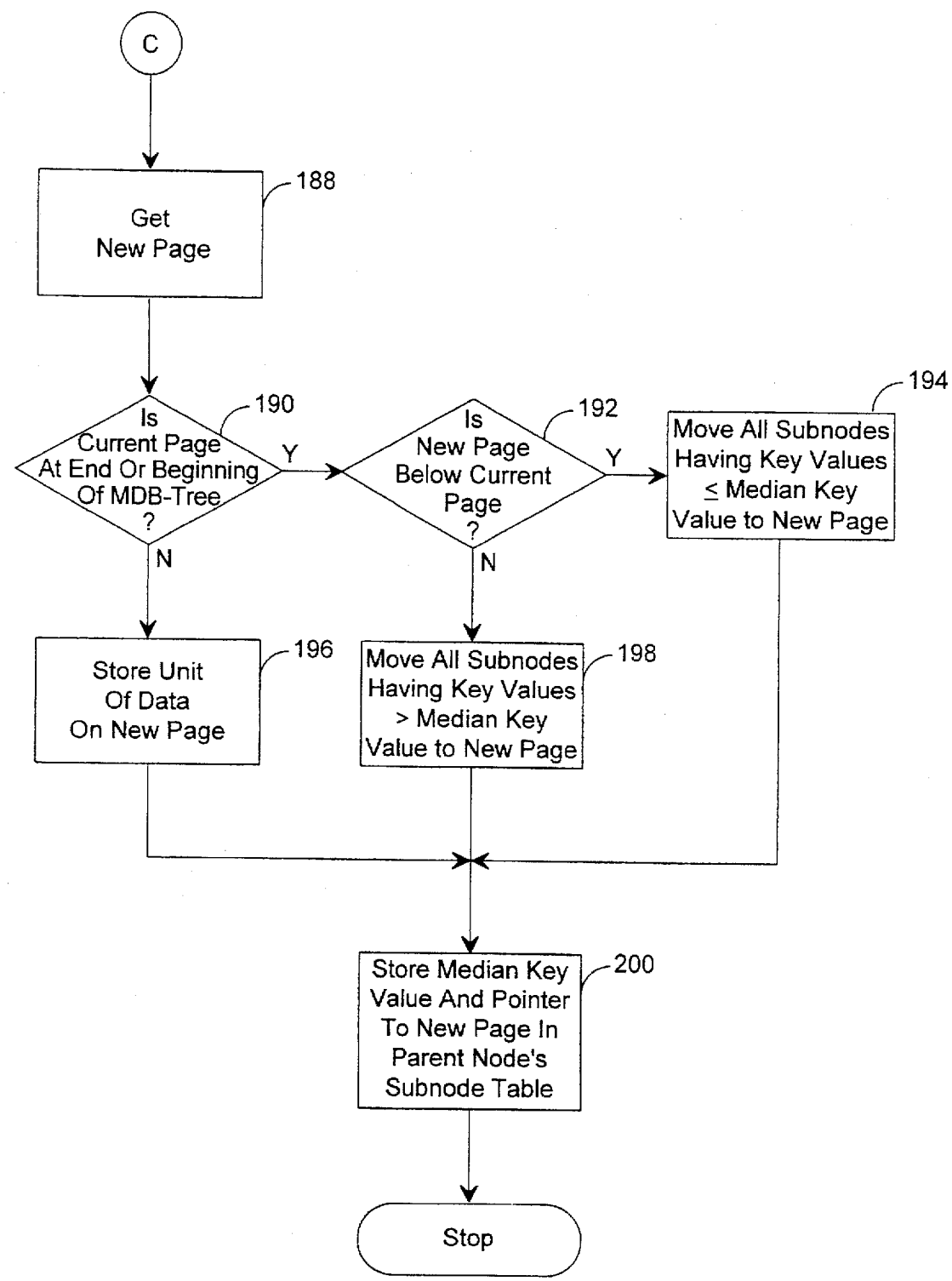

FIG. 8C is a flow diagram of steps used by the tree manager to horizontally split a page. In step 188, the tree manager requests allocation of a new page from a memory management routine provided by the file system. A special case of horizontal splitting occurs when inserting a new node at the end (or at the beginning) of the tree. It is easy to recognize the end (or the beginning) of the tree because the page's next page (or previous page) link field is null. In step 190, the tree manager determines whether the current page is at the end or beginning of the MDB-tree. If so, then instead of splitting the page in half, in step 196 the tree manager stores only the new unit of data on the newly-allocated next page. This saves overhead and leads to compact space utilization when nodes are being added one at a time in key value sequence.

If the current page is not at the end or the beginning of the MDB-tree, then in step 192 the tree manager determines whether the new page is physically located below the current page (i.e., at a lower address than the current page). If the new page is physically located below the page being split, then in step 194, the tree manager moves all of the child nodes having a key value less than or equal to a median key value to the new page. The median key value is the median of all of the ordered key values stored in the page being split. If the new page is located physically above the current page (i.e., a higher memory address), then in step 198, the tree manager moves all of the child nodes having a key value greater than or equal to the median key value to the new page. After moving the child nodes to the new page, in step 200, the tree manager stores the median key value in the key value table of the parent node to the moved child nodes and stores the node identifier of the new page's TOP node in the subnode table of the parent node to the moved child nodes.

A right horizontal split moves all child nodes with key values greater than or equal to the split key value to an adjacent next page. A left horizontal split moves all child nodes with key values less than or equal to the split key value to an adjacent previous page. In the original page, the deleted subset of nodes free-up page space and page tags.

In a preferred embodiment of the present invention, the above-disclosed methods lead to a uniform and easily-maintainable means for representing and retrieving stored information. The above described methods are useful in representing for example, large records, very large field occurrences (Binary Large Objects), and bitmaps. Bitmaps are represented particularly well by a Multidimensional B-tree because bitmaps, e.g., a video image, often grow with time. The maintenance algorithms provided by the present invention effectively deal with a bitmap's increase in size.

Although the methods and systems of the present invention have been described in terms of a preferred embodiment, it is not intended that the invention be limited to this embodiment. Modifications within the spirit of the invention will be apparent to those skilled in the art. The scope of the present invention is defined only by the claims that follow.

I claim:

1. A method in a computer system having hierarchically-related data objects for storing a data object on a storage device, the method comprising the steps of:

provision a first node entry having a first associated node identifier on the storage device as part of a tree data structure that indexes the hierarchically-related data objects, the first node entry comprising a table for storing key values and a table for storage identifying information for subnodes, and a first data area for storing at least one data object;

receiving a request to store the data object on the storage device;

determining whether the data object can be stored in the first data area;

when it is determined that the data object cannot be stored in the first data area,
  creating a new node entry on the storage device, the new node entry having a new node identifier and comprising a new key value table, a new subnode table, and a new data area,
  storing the data object in the new data area,
  creating a pointer node entry on the storage device, the pointer node entry having a pointer node identifier,
  storing the new node identifier in the pointer node entry, and
  storing the pointer node identifier in the first subnode table; and when it is determined that the data object can be stored in the first data area, storing the data object in the first data area.

2. A method in a computer system having hierarchically-related data objects for storing a data object having an associated key value and a size on a storage device, the method comprising the steps of:

storing a plurality of node entry groups on the storage device, each node entry group comprising one or more node entries and having an amount of available space, each node entry having a unique node identifier and comprising a key value table, a subnode table, and a data area for storing at least one data object;

based upon the key value of the data object, determining in which of the plurality of node entry groups the data object should be stored;

based upon the size of the data object and the amount of available space in the determined node entry group, determining whether the data object can be stored in the determined node entry group;

when the amount of available space in the determined node entry group is smaller than the size of the data object, creating a new node entry group on the storage device, the new node entry group containing a new node entry having a new node identifier and comprising a new key value table, a new subnode table, and a new data area;

storing the data object in the new data area; and storing the new node identifier of the new node entry in the subnode table of the determined node entry.

3. The method of claim 2 wherein the step of determining in which one of the node entries the data object should be stored includes the step of comparing the key value of the data object to the key values stored in each node entry.

4. The method of claim 2 wherein the determined node entry is contained within a fixed-size page having an amount of available space, and wherein the step of determining whether the data object can be stored in the determined node entry includes comparing the size of the data object to the amount of available space in the page.

5. A method in a computer system having hierarchically-related data objects for storing a selected data object on a storage device logically divided into a plurality of fixed-size blocks, each block comprising a block header, an array of tags, and a plurality of node entries, each node entry comprising a key value table, a subnode table, and a data table, the method comprising the steps of:

assigning a key value to the selected data object;

based upon the assigned key value, determining in which node entry the selected data object should be stored;

determining whether the selected data object can be stored in the block which contains the determined node entry;

when the selected data object can be stored in the block which contains the determined node entry, determining whether the selected data object can be stored in the determined node entry;

when the selected data object can be stored in the determined node entry, storing the selected data object in the determined node entry;

when the selected data object cannot be stored in the determined node entry but can be stored in the block which contains the determined node entry,
  creating a new node entry and storing the selected data object in the new node entry,
  storing the node identifier of the new node entry in the subnode table of the determined node entry, and
  storing the key value of the selected data object in the key value table of the determined node entry; and when the selected data object cannot be stored in the determined node entry and cannot be stored in the block which contains the determined node entry,
  requesting allocation of a new block,
  creating a new node entry and storing the selected data object in the new node entry,
  storing a pointer node in the block which contains the determined node entry and storing the node identifier of the new node entry in the pointer node,
  storing the node identifier of the pointer node in the subnode table of the determined node entry, and
  storing the key value of the selected data object in the key value table of the determined node entry.

6. A computer system having indexed data for storing a selected data object on a storage device, the selected data object having an associated key value and a size, the storage device storing a plurality of node entry groups, each node entry group comprising one or more node entries and having an amount of available space, each node entry having a unique node identifier and comprising a key value table, a subnode table, and a data area for storing at least one data object, comprising:

means for determining in which of the plurality of node entry groups the selected data object should be stored based upon the key value of the selected data object;

means for determining whether the selected data object can be stored in the determined node entry group based upon the size of the data object and the amount of available space in the determined node entry group;

means for creating a new node entry group on the storage device when the amount of available space in the determined node entry group is smaller than the size of the data object, the new node entry group containing a new node entry having a new node identifier and comprising a new key value table, a new subnode table, and a new data area;

means for storing the data object in the new data area; and means for storing the new node identifier of the new node entry in the subnode table of the determined node entry.

7. The computer system of claim 6 wherein the means for determining in which one of the node entries the selected data object should be stored includes means for comparing the key value of the selected data object to the key values stored in each node entry.

8. The computer system of claim 6 wherein the each determined node entry is contained within a fixed-size page having an amount of available space and wherein the means for determining whether the selected data object can be stored in a determined node entry contained within a particular fixed-size page includes comparing the size of the selected data object to the amount of available space in the particular page.

9. A computer system having hierarchically-related data objects for storing a selected data object on a storage device, the storage device logically divided into a plurality of fixed-size blocks, each block comprising a block header, an array of tags, and a plurality of node entries, each node entry comprising a key value table, a subnode table, and a data table, comprising:

means for assigning a key value to the selected data object;

means for determining in which node entry the selected data object should be stored based upon the assigned key value and designating that node entry as the determined node entry;

means for determining whether the selected data object can be stored in the block which contains the determined node entry;

means for determining whether the selected data object can be stored in the determined node entry when the selected data object can be stored in the block which contains the determined node entry;

means for storing the selected data object in the determined node entry when the selected data object can be stored in the determined node entry;

when the selected data object cannot be stored in the determined node entry but can be stored in the block which contains the determined node entry, means for creating a new node entry and storing the selected data object in the new node entry, means for storing the node identifier of the new node entry in the subnode table of the determined node entry, and means for storing the key value of the selected data object in the key value table of the determined node entry; and when the selected data object cannot be stored in the determined node entry and cannot be stored in the block which contains the determined node entry, means for requesting allocation of a new block, means for creating a new node entry and storing the selected data object in the new node entry, means for storing a pointer node in the block which contains the determined node entry and storing the node identifier of the new node entry in the pointer node, means for storing the node identifier of the pointer node in the subnode table of the determined node entry, and means for storing the key value of the selected data object in the key value table of the determined node entry.

10. A computer-readable storage device containing instructions for controlling a computer system having hierarchically-related data objects to perform a method for storing a data object on a storage device, the method comprising the steps of:

providing a first node entry having a first associated node identifier on the storage device as part of a tree data structure that indexes the hierarchically-related data objects, the first node entry comprising a table for storing key values and a table for storage identifying information for subnodes, and a first data area for storing at least one data object;

receiving a request to store the data object on the storage device;

determining whether the data object can be stored in the first data area;

when it is determined that the data object cannot be stored in the first data area, creating a new node entry on the storage device, the new node entry having a new node identifier and comprising a new key value table, a new subnode table, and a new data area, storing the data object in the new data area, creating a pointer node entry on the storage device, the pointer node entry having a pointer node identifier, storing the new node identifier in the pointer node entry, and storing the pointer node identifier in the first subnode table; and when it is determined that the data object can be stored in the first data area, storing the data object in the first data area.

11. A computer-readable storage device containing instructions for controlling a computer system having hierarchically-related data objects to perform a method for storing a data object having an associated key value and a size on a storage device, the method comprising the steps of:

storing a plurality of node entry groups on the storage device, each node entry group comprising one or more node entries and having an amount of available space, each node entry having a unique node identifier and comprising a key value table, a subnode table, and a data area for storing at least one data object;

based upon the key value of the data object, determining in which of the plurality of node entry groups the data object should be stored;

based upon the size of the data object and the amount of available space in the determined node entry group, determining whether the data object can be stored in the determined node entry group;

when the amount of available space in the determined node entry group is smaller than the size of the data object, creating a new node entry group on the storage device, the new node entry group containing a new node entry having a new node identifier and comprising a new key value table, a new subnode table, and a new data area;

storing the data object in the new data area; and storing the new node identifier of the new node entry in the subnode table of the determined node entry.

12. A computer-readable storage device containing instructions for controlling a computer system having hierarchically-related data objects to perform a method for storing a selected data object on a storage device logically divided into a plurality of fixed-size blocks, each block comprising a block header, an array of tags, and a plurality of node entries, each node entry comprising a key value table, a subnode table, and a data table, the method comprising the steps of:

assigning a key value to the selected data object;

based upon the assigned key value, determining in which node entry the selected data object should be stored;

determining whether the selected data object can be stored in the block which contains the determined node entry;

when the selected data object can be stored in the block which contains the determined node entry, determining whether the selected data object can be stored in the determined node entry;

when the selected data object can be stored in the determined node entry, storing the selected data object in the determined node entry;

when the selected data object cannot be stored in the determined node entry but can be stored in the block which contains the determined node entry, creating a new node entry and storing the selected data object in the new node entry, storing the node identifier of the new node entry in the subnode table of the determined node entry, and storing the key value of the selected data object in the key value table of the determined node entry; and when the selected data object cannot be stored in the determined node entry and cannot be stored in the block which contains the determined node entry, requesting allocation of a new block, creating a new node entry and storing the selected data object in the new node entry, storing a pointer node in the block which contains the determined node entry and storing the node identifier of the new node entry in the pointer node, storing the node identifier of the pointer node in the subnode table of the determined node entry, and storing the key value of the selected data object in the key value table of the determined node entry.

13. A method for storing data objects that are organized into a multi-level hierarchy of data objects, each data object having a key, each data object associated with data objects at the next lower-level in the hierarchy of data objects, the method comprising:

constructing a highest-level B-tree data structure that indexes the keys for the data objects of the highest level in the hierarchy of data objects, the highest-level B-tree data structure having leaf nodes that correspond to the data objects of the highest level in the hierarchy of data objects; and for each successive lower level in the hierarchy of data objects, constructing a lower-level B-tree data structure associated with each data object of the next-higher level in the hierarchy of data objects that indexes the keys for the data objects of the lower level in the hierarchy of data objects, the lower-level B-tree data structure having leaf nodes that correspond to data objects of the lower level whereby each data object at each level in the hierarchy of data objects has an associated B-tree data structure that indexes the data objects of the next lower level in the hierarchy of data objects.

14. The method of claim 13 wherein the nodes of the B-tree data structures each contain three storage areas, including a storage area for storing pointers to lower-level nodes, a storage area for storing maximum key values corresponding to each lower-level node pointer, and a storage area for a data object.

15. The method of claim 14 wherein a data object is stored in the leaf node of the B-tree that indexes the key for that data object.

16. The method of claim 15 wherein a lower-level B-tree data structure is associated with a data object of the next-higher level in the hierarchy of data objects by a pointer to the lower-level B-tree data structure stored in the pointer storage area of the B-tree node that contains the data object.

17. A method for storing data objects organized into a multi-level hierarchy of data objects into the nodes of a data structure comprising a tree of B*-trees, each data object having a key, each data object associated with data objects at the next lower-level in the hierarchy of data objects, each node of the data structure having storage areas, including a storage area for storing pointers to lower-level nodes, a storage area for storing maximum key values corresponding to each lower-level node pointer, and a storage area for a data object, the method comprising:

constructing a highest-level B*-tree that indexes the keys for the data objects of the highest level in the hierarchy of data objects, the highest-level B*-tree having leaf nodes that contain the data objects of the highest level in the hierarchy of data objects; and for each successive lower level in the hierarchy of data objects, constructing a lower-level B*-tree associated with each data object of the next-higher level in the hierarchy of data objects, the lower-level B*-tree indexing the keys of the data objects of the lower level in the hierarchy of data objects, the lower-level B*-tree having leaf nodes that contain the data objects of the lower level in the hierarchy of data objects.

18. The method of claim 17 wherein a lower-level B*-tree is associated with a data object of the next-higher level in the hierarchy of data objects by a pointer to the lower-level B*-tree stored in the pointer storage area of the B*-tree node of that contains the data object.

19. The method of claim 18 wherein the nodes of the data structure are stored in pages of memory that are stored on and retrieved from a disk.

20. The method of claim 19 wherein, when a data object is to be added to a node that would cause that node to expand to a size that cannot be contained within a memory page, when the data object can be split into sub-objects, the data object is split into sub-objects and stored in a sub-tree referenced by a pointer from the node, and when the data object cannot be split into sub-objects, the node is split, and the split is propagated up to successively higher-level nodes of B*-tree that contains the node until addition of a pointer to a higher-level node does not cause the higher-level node to expand to a size that cannot be contained within a memory page.

21. A computer-readable storage device containing instructions for controlling a computer system to store data objects that are organized into a multi-level hierarchy of data objects, each data object having a key, each data object associated with data objects at the next lower-level in the hierarchy of data objects; the method comprising:

constructing a highest-level B-tree data structure that indexes the keys for the data objects of the highest level in the hierarchy of data objects, the highest-level B-tree data structure having leaf nodes that correspond to the data objects of the highest level in the hierarchy of data objects; and for each successive lower level in the hierarchy of data objects, constructing a lower-level B-tree data structure associated with each data object of the next-higher level in the hierarchy of data objects that indexes the keys for the data objects of the lower level in the hierarchy of data objects, the lower-level B-tree data structure having leaf nodes that correspond to data objects of the lower level.

22. The computer-readable storage device of claim 21 further containing instructions to specify that the nodes of the B-tree data structures each contain three storage areas, including a storage area for storing pointers to lower-level nodes, a storage area for storing maximum key values corresponding to each lower-level node pointer, and a storage area for a data object.

23. The computer-readable storage device of claim 22 further containing instructions to store each data object in the leaf node of the B-tree that indexes the key for that data object.

24. The computer-readable storage device of claim 23 further containing instructions to associate a lower-level B-tree data structure with a data object of the next-higher level in the hierarchy of data objects by storing a pointer to the lower-level B-tree data structure in the pointer storage area of the B-tree node that contains the data object.

* * * * *